April 1, 1924.

G. F. HUNTER

VALVE SPRING CLAMP

Filed Feb. 20, 1923

INVENTOR:
George F. Hunter
by Macleod, Calver, Copeland & Dike
Attys

Patented Apr. 1, 1924.

1,488,880

UNITED STATES PATENT OFFICE.

GEORGE F. HUNTER, OF BOSTON, MASSACHUSETTS.

VALVE-SPRING CLAMP.

Application filed February 20, 1923. Serial No. 620,205.

*To all whom it may concern:*

Be it known that I, GEORGE F. HUNTER, a citizen of the United States, residing at Boston, county of Suffolk, State of Massachusetts, have invented a certain new and useful Improvement in Valve-Spring Clamps, of which the following is a specification, reference being had therein to the accompanying drawings.

The invention relates to a new and useful improvement in valve spring clamps. The object of the invention is to provide a tool for convenient use in removing the valve spring and reassembling the spring with the valve when the valve is being put back into its place in the cylinder after it has been removed for grinding or for other purposes. It is especially intended for use with a valve in an internal combustion engine and more particularly in connection with automobile engines. One object of the invention is to provide such a clamp so constructed that the spring may be readily compressed and automatically retained in its compressed form for as long a time as desired, so that not only may the spring be compressed for removing the spring, but the tool may be then set aside with the spring still held thereby in its compressed form until such time as is desired to reassemble the spring with the valve.

The invention will be fully understood from the following description when taken in connection with the accompanying drawings, and the novel features thereof will be pointed out and clearly defined in the claims at the close of this specification.

Figure 1:
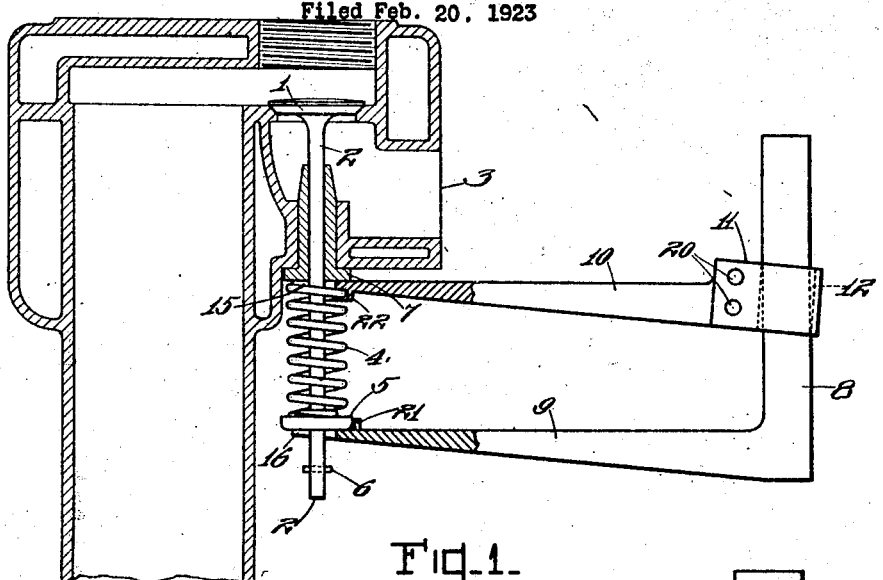
Fig. 1 is an elevation partly in section of a portion of a cylinder and valve showing the valve spring assembled with the valve but in its compressed form in the grip of the clamp, as it will appear just as the spring is about to be removed from the valve and before the pin is withdrawn, or just after it is assembled with the valve but before the tool is released.

Referring now to the drawings: 1 represents the head of the valve, 2 the valve stem, 3 a cylinder block through which the valve stem passes, and 4 the valve spring. The lower end of the valve stem is seated in the cup 5 which, when the parts are assembled and the spring is in its normal position, will rest upon a pin 6 which passes through the valve stem, the upper end of the valve spring being seated at 7 upon any suitable seat, the seat shown in the drawings being a flange at the lower end of a bushing in the cylinder block through which the valve stem passes.

The tool embodying the invention is as follows: It comprises two members: an angle bar having an upright arm 8 and a horizontal arm 9 extending substantially at right angles to the upright arm 8, forms one member of the tool, and a second horizontal member 10 which is movable with relation to the said angle bar member, forms the second member of the device. The angle bar member comprising the two portions 8, 9 may be formed integral out of a single bar of metal or said two portions 8, 9 may be separate bars rigidly secured together.

Figure 2:
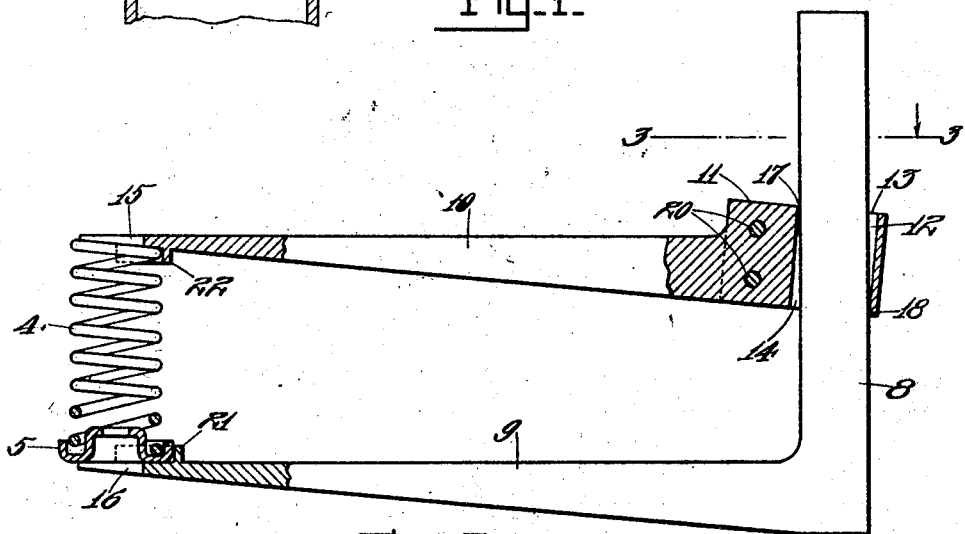
Fig. 2 is a view showing the spring in its compressed form in the grip of the clamp when the spring is about to be assembled with the valve.
Figure 3:
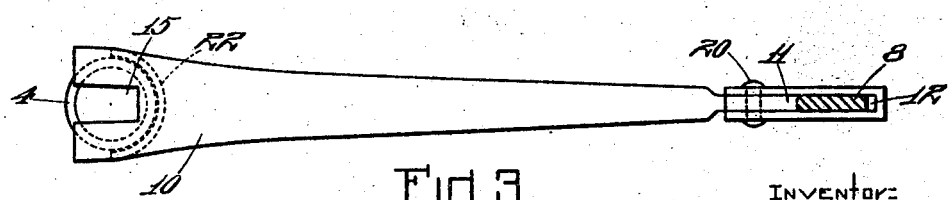
Fig. 3 is a section on line 3—3 of Fig. 2.

The member 10 is formed with a head 11 having a slot 12 through which the upright arm 8 loosely passes, the width of said slot being somewhat greater than the width of the arm 8, as shown by the space 13 on the upper side and the space 14 on the lower side, as viewed in Figures 1 and 2.

As shown in the drawings, the slot 12, in the head of the upper member 10 for the passage of the upright arm 8, is provided, by means of a strap which is doubled upon itself, to form a loop which furnishes the passage 12, and said strap is secured to the shank of the arm 10 by means of rivets 20. It is obvious, however, that the entire upper member, including the jaw 10 and the head with the slotted portion for receiving the arm 8, may be integral.

The two arms 9, 10 may be referred to as two jaw members. The two jaw members 9, 10 are bifurcated at their outer ends, forming respectively the open slots or throats 15, 16. These open slots 15, 16 are of sufficient width to enable the branches of the two jaw members to straddle the valve stem 2. It will be obvious that although the upright member 8 passes loosely through the slot 12 in the upper jaw member 10 with normally quite a clearance space, if the outer ends of the two members 9, 10 are spread apart from each other, that is, if the outer or bifurcated end of the jaw member 10 is slightly tipped upward or the outer end of the lower jaw member 9 is tipped down, it will cause the upper inside edge 17 of the slot 12 in the head of the jaw 10 to bite against the upright member 8, and it will cause the lower outside edge 18 of said slot to also bite against the outer edge of the upright member 8. It will be obvious that, if the two jaw members are maintained in this spread position by pressure, there will be sufficient friction between the upright member 8 and the gripping portions 17, 18 of the walls of the slot 12 to prevent the sliding of the jaw member 10 either up or down on the upright arm 8.

In assembling the valve and spring with the cylinder block after both the valve and the spring have been entirely detached, the spring 4 is seated in the cup 5 while still detached from the valve stem, then the spring with the cup 5 is inserted between the two jaws 9, 10 near their outer ends so that the slots 15, 16 of the jaws will be centered with the passages through the valve spring. While the parts are held in this position, the jaw 10 will be pressed down by an even pressure while the jaws are parallel with each other, so as to cause the slotted head of the jaw 10 to slide down on the upright arm 8 and cause the forked end of said jaw to compress the spring. For convenience in doing this the lower jaw 9 may be rested on any suitable bottom support so as to be held firm while the upper jaw is being pressed down. When the spring is sufficiently compressed the downward pressure of the hand of the operator on the arm 10 will be released and the expanding pressure of the spring 4 will force the outer end of the upper jaw 10 slightly upward, care being taken in releasing the hand pressure upon the jaw 10 to prevent the slotted head portion of the arm 10 from being moved up while the spring is expanding, so as to insure that the forked end of the jaw 10 will move upward without moving the head portion. When the outer end of the jaw 10 is thus forced upward by the pressure of the spring while the head portion is held from sliding, the entire member 10 is tipped at a slight angle to the upright arm 8, thus causing the corners 17, 18 of the walls of the slot to bite against the upright arm 8 so that the upper jaw cannot slide but will hold the spring in its compressed position, as shown in Figure 2. This shortens the spring and holds the two jaws 9, 10 sufficiently close together, so that there is ample clearance space between the seat 7 in the cylinder block and the pin hole in the valve stem, through which the pin 6 is to be introduced, and will permit the pin to be passed through the hole.

The arm 8 is of sufficient length to extend above the movable jaw 10, and said upper extending portion serves as a convenient handle for handling the tool when it is used.

After the spring has been clamped between the jaws, as just above described, the device should be so positioned that the slots 15, 16 at the outer ends of the said jaws and the hole through the cup 5 will be in alinement with the hole in the cylinder block, through which the valve stem is to be inserted. The valve stem 2 will then be inserted in proper position with the stem 2 passing down through the spring 4 and the hole in the cup 5, the valve head 1 being seated on the valve seat in the cylinder block 3, and the pin 6 will be inserted in the hole in the valve stem, the tool, during this time, being held in the position shown in Figure 1, with the lower jaw 9 elevated somewhat above the pin 6 so as not to interfere with the introduction of the pin in the hole in the valve stem.

The valve parts now being thus assembled, the tool is pulled out away from the spring, which may be accomplished by a sharp horizontal pull of the hand which grips the upright portion 8 of the tool. The engagement of the valve stem with the hole in the cylinder block or its bushing, maintains the valve stem in its fixed position, and the cup 5, through which the valve stem passes, will be held by the valve stem also from being pulled away with the tool. As soon as the tool is removed, the spring is free to expand and the cup 5 will drop down to its seat upon the pin 6 and be held down by the spring while the upper end of the spring will snap up against its seat 7.

When it is desired to remove the valve, the spring has to be compressed at the lower end to release the pressure on the pin 6, whereupon the pin may be pulled out and the cup and spring will drop off the valve stem, and the valve may be removed. My improved clamp may be used for the purpose of compressing the spring to remove it, as well as for use in reassembling the parts.

Preferably the lower jaw member 9 is formed with an upwardly extending lip 21 and the upper jaw 10 is formed with a downwardly extending lip 22, bordering the respective slotted ends of the jaws, to serve as guides in centering the spring between the jaws.

What I claim is:

1. A valve spring clamp comprising a lower jaw member having at one end an upright arm, an upper jaw member having a head formed with a slot through which the upright arm of the lower jaw member passes, said slot being of somewhat greater width than the width of the upright arm so that the upper jaw member may not only slide upon the said upright arm but also be capable of a slight tipping movement on said upright arm as a pivot, the outer ends of both of said jaws being bifurcated.

2. A valve spring clamp comprising a jaw member having an arm at substantially right angles thereto, a second jaw member formed with a slot through which the arm of the first jaw member loosely passes, said two jaw members being substantially parallel with each other, said second jaw member being normally slidable on said arm, the outer ends of said jaws being adapted to grip the opposite ends of a valve spring and to compress the valve spring when the movable jaw member is pressed by the operator towards the fixed jaw member, the expansion pressure of the spring after it has been compressed causing the outer end of the movable jaw member to spread slightly away from the fixed jaw member, thereby causing the walls of the slot which engage with the said arm to bind on the arm in such manner as to hold the movable jaw from sliding movement and holding the spring compressed.

3. A valve spring clamp comprising a jaw member having an arm at substantially right angles thereto, a second jaw member formed with a slot through which the arm of the first jaw member loosely passes, said two jaw members being substantially parallel with each other, said second jaw member being normally slidable on said arm, the outer ends of said jaws being adapted to grip the opposite ends of a valve spring the slotted connection between the said second jaw and the arm being such that the expansive pressure of a compressed spring gripped between the outer ends of said jaws will slightly tip the movable jaw with relation to the said arm and thereby cause the corner edges of the walls of the slot to frictionally engage the said arm and prevent sliding of the movable jaw on the arm in a direction away from the fixed jaw.

4. A valve spring clamp comprising a jaw member having at one end an arm extending substantially at right angles to the jaw member, a second jaw member having a head formed with a slot through which the said arm of the first jaw member passes loosely, said slot being of sufficient size so that said second jaw member may not only slide upon said arm but also be capable of a slight tipping movement on said arm in such manner as to bring two diagonally opposite ends of said slot into engagement with the said arm and thereby prevent the said upper jaw from sliding on said arm when the outer ends of said two jaws are spread apart from each other, the outer ends of both of said jaws being formed with open slots to permit the ready release of said jaws from a valve stem when the said jaws are in gripping engagement with the valve spring while the valve spring is in position around the valve stem.

5. A valve spring clamp comprising a lower jaw member having at one end an upright arm, an upper jaw member having a head formed with a slot through which the upright arm of the lower jaw member passes, said slot being of somewhat greater width than the width of the upright arm, so that the upper jaw member may not only slide upon the said upright arm but also be capable of a slight tipping movement on said upright arm as a pivot, the outer ends of both of said jaws being bifurcated, said jaws being formed with lips near the outer edges of the clamping faces to form guides to center the valve spring.

In testimony whereof I affix my signature.

GEORGE F. HUNTER.